United States Patent Office 3,592,625
Patented July 13, 1971

3,592,625
FERTILIZER
Willi Burkhart, Chur/Gross, and Kurt Hungerbuhler, Rieden, near Nussbaumen, Switzerland, assignors to Inventa A.G. fur Forschung und Patentverwertung Zurich
No Drawing. Continuation-in-part of application Ser. No. 476,691, Aug. 2, 1965. This application Apr. 13, 1970, Ser. No. 28,042
Int. Cl. C05c *9/00*
U.S. Cl. 71—28                                              8 Claims

ABSTRACT OF THE DISCLOSURE (2-chloroethyl)-trimethylammonium chloride or (2-bromoethyl)-trimethylammonium bromide is added to a urea melt containing 10–20% water. The mixture is homogenized, then prilled. An ammoniacal urea melt may be employed. The ammoniacal urea melt has a pH of 8–11.

---

This application is a continuation-in-part of application Ser. No. 476,691, filed Aug. 2, 1965, and now abandoned.

The invention relates to a fertilizer compound of urea with an admixture of certain salts of quaternary ammonium bases and, more particularly, to such a mixture having a definite water content.

It is known that, for example, cereal plants which have been treated at the beginning of the vegetation period with salts of quaternary ammonium bases of the general formula

[(CH₃)₃·N·R]⁺OH⁻ 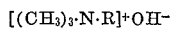

wherein R denotes an ethyl, vinyl or allyl radical or a saturated or unsaturated halogen-substituted hydrocarbon radical with a maximum of 3 carbon atoms, said salts having the general formula

[(CH₃)₃·N·R]⁺X⁻ 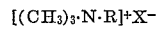

wherein R is as described above and X is chlorine or bromine, give shorter and thicker stalks for the same yield of grain. This is associated with increased strength, which largely prevents storage losses (see, for example, Austrian Pat. No. 222,145).

The following have heretofore been mentioned as active salts:

(2-chloroethyl)-trimethylammonium chloride (chlorocholine chloride)
(2-bromoethyl)-trimethylammonium bromide
bromoethyltrimethylammonium bromide
(2-bromo-n-propyl)-trimethylammonium bromide
ethyltrimethylammonium bromide
vinyltrimethylammonium bromide and
allyltrimethylammonium bromide.

A particularly favorable manner in which said salts are applied consists in using them together with nitrogenous fertilizers as top dressing at the beginning of the vegetation period. A drawback of this method is that, for example, chlorocholine chloride, which is employed on a wide basis, is sensitive to air and moisture. Mixtures of chlorocholine chloride and granular or pulverulent fertilizer, for instance urea, have a tendency to cake and deliquesce. Moreover, even during short-term storage or during transport and in particular during the spreading of prilled urea or other granular fertilizers dusted with chlorocholine chloride, separation of the fertilizer and the chlorocholine chloride can easily occur so that a satisfactory application is not possible.

For the foregoing reasons, attempts have therefore been made to add chlorocholine chloride to a urea melt prior to the prilling process, in the expectation that the active substance sealed in the prilled urea would not decompose, would not be hygroscopic and that no separation would occur. Unfortunately, however, it has been found during these attempts at prilling a mixture of urea and chlorocholine chloride that the biuret content of the mixture increases to ten times as much, whereas the chlorocholine chloride content, with additions of 1–3%, decreases by up to 20%. It has also not been possible to avoid the loss of chlorocholine chloride when urea melts as free as possible from water have been employed in order to prevent any hydrolysis.

Surprisingly, it has now been found that the very presence of water prevents decomposition of the chlorocholine chloride (or of the salts of the other quaternary ammonium bases mentioned).

The process according to the invention for the manufacture of stable granular and homogeneous mixtures of urea and salts of non-phytotoxic acids with quaternary ammonium bases of the general formula

[(CH₃)₃·N·R]⁺OH⁻ 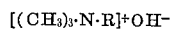

wherein R denotes an ethyl, vinyl or allyl radical or a saturated or unsaturated halogen-substituted hydrocarbon radical with a maximum of 3 carbon atoms, is characterized by adding the salts to a urea melt containing 10–20% of water or to an ammoniacal urea melt containing 10–20% of water and having a pH of about 8–11. The mixture is then homogenized, for example by stirring or passing inert gas through it. The homogenization step is followed by prilling.

Normally, an addition of 1–4% of the active substance to the urea is sufficient for the desired effect to be obtained when dressing is carried out in the usual manner. The use of chlorocholine chloride as the salt of a quaternary base has been found to be particularly advantageous, especially in an economic respect, since this substance can be produced in relatively large amounts at favorable cost.

The invention now will be further illustrated by the following examples. However, it should be understood that these are given merely by way of explanation, and not of limitation, and that numerous changes may be made in the details without departing from the spirit and scope of the invention as hereinafter claimed.

EXAMPLE 1

1.00 percent by weight of chlorocholine chloride was added to a urea melt which contained 15% water at the melting temperature of about 95° C. and the mixture was stirred and then prilled in the usual manner by spraying. Analysis of the prilled fertilizer showed an unchanged biuret content of 0.12% and a chlorocholine chloride content of 0.98% by weight.

EXAMPLE 2

3.00% by weight of chlorocholine chloride was added to a urea melt which contained 12% water at the melting temperature of 99° C., and the mixture was stirred and then prilled in the usual manner by spraying. Analysis of the prilled fertilizer showed an unchanged biuret content of 0.18% and a chlorocholine chloride content of 3.00%.

EXAMPLE 3

1.00 percent by weight of chlorocholine chloride was added to an ammoniacal urea melt which contained 15% water at the melting temperature of about 95° C. The melt had a pH of 10.5. The mixture was stirred and then prilled in the usual manner by spraying. Analysis of the prilled fertilizer showed an unchanged biuret content of 0.12% and a chlorocholine chloride content of 0.98% by weight.

EXAMPLE 4

3.00% by weight of chlorocholine chloride was added to an ammoniacal urea melt which contained 12% water at the melting temperature of 99° C. The melt had a pH of 9.0. The mixture was stirred and then prilled in the usual manner by spraying. Analysis of the prilled fertilizer showed an unchanged biuret content of 0.18% and a chlorocholine chloride content of 3.00%.

EXAMPLE 5

The same process was carried out as set forth in Example 1, except that the urea melt contained 3 to 5 grams per liter of ammonia, and had a pH in excess of 13. The results were the same as set forth in Example 1.

It should be noted that in the above examples and in the method of the present invention bromocholine bromide can be used in place of chlorocholine chloride with the same success.

Advantageously, the aquous urea solution (melt) is directly obtained from the technical urea synthesis (viz. the known reaction of ammonia and carbon dioxide). It is well known that such solutions are alkaline in reaction. This is due to their content of unreacted ammonia. The pH of such solutions generally ranges from about 8 to 11. It is, of course, also possible to utilize a neutral aqueous urea solution in the process of the instant invention.

What is claimed is:

1. A process for the manufacture of a mixture of urea and (2-chloroethyl)-trimethylammonium chloride which comprises adding said (2-chloroethyl)-trimethylammonium chloride to a urea melt containing 10–20% water, homogenizing the mixture thus obtained, and prilling the same.

2. The process as defined in claim 1 wherein 1 to 4 weight percent of said chloride is incorporated in said mixture.

3. The process as defined in claim 1 wherein homogenization is carried out by mechanical agitation.

4. The process as defined in claim 1 wherein homogenization is carried out by passing an inert gas through the mixture.

5. A process for the manufacture of a mixture of urea and (2-bromoethyl)-trimethylammonium bromide which comprises adding said (2-bromoethyl)-trimethylammonium bromide to a urea melt containing 10–20% water, homogenizing the mixture thus obtained, and prilling the same.

6. The process as defined in claim 2 wherein 1 to 4 weight percent of said bromide is incorporated in said mixture.

7. The process as defined in claim 2 wherein homogenization is carried out by mechanical agitation.

8. The process as defined in claim 2 wherein homogenization is carried out by passing an inert gas through the mixture.

References Cited

UNITED STATES PATENTS

| | | |
|---|---|---|
| 3,025,571 | 3/1962 | Beecher et al. |
| 3,369,885 | 2/1968 | Takahashi et al. _____ 71—29 |

OTHER REFERENCES

Nitrogeneous Fertilizer—Chemical Abstracts—Lirgen et. al., Dec. 15, 1960.

Organic Chemistry, Fieser et al., D.C. Heath and Company, 1944 pp. 116, 117, 124.

REUBEN FRIEDMAN, Primary Examiner

R. BARNES, Assistant Examiner

U.S. Cl. X.R.

71—69DB